(12) United States Patent
Sato

(10) Patent No.: US 12,508,941 B2
(45) Date of Patent: Dec. 30, 2025

(54) CONTROL APPARATUS FOR MANAGING CHARGING PLANS FOR VEHICLE BATTERIES

(71) Applicant: SUBARU CORPORATION, Tokyo (JP)

(72) Inventor: Kazune Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 41 days.

(21) Appl. No.: 18/611,575

(22) Filed: Mar. 20, 2024

(65) Prior Publication Data

US 2024/0326637 A1 Oct. 3, 2024

(30) Foreign Application Priority Data

Mar. 29, 2023 (JP) .................. 2023-054200

(51) Int. Cl.
*B60L 53/68* (2019.01)
*B60L 53/65* (2019.01)

(52) U.S. Cl.
CPC ............... *B60L 53/68* (2019.02); *B60L 53/65* (2019.02)

(58) Field of Classification Search
CPC .......... B60L 53/63; B60L 53/65; B60L 53/68; Y02T 10/70; Y02T 10/7072; Y02T 90/12
See application file for complete search history.

(56) References Cited

U.S. PATENT DOCUMENTS

| | | | | |
|---|---|---|---|---|
| 2014/0062401 A1* | 3/2014 | Gadh | ...................... | B60L 53/67 320/109 |
| 2021/0387535 A1* | 12/2021 | Makino | .................. | G01C 21/36 |
| 2022/0402397 A1* | 12/2022 | Nishimura | .............. | B60L 53/36 |

FOREIGN PATENT DOCUMENTS

JP 2020-198737 A 12/2020

* cited by examiner

*Primary Examiner* — Omer S Khan
(74) *Attorney, Agent, or Firm* — Rimon P.C.

(57) ABSTRACT

A control apparatus for a charging system that is configured to charge batteries of respective vehicles includes one or more processors and one or more memories. The control apparatus includes one or more processors, and one or more memories coupled to the one or more processors. The one or more processors are configured to: acquire, from each of the vehicles, charging data comprising at least data on a target charge amount; determine, based on the charging data acquired from each of the vehicles, a charging plan comprising at least an actual charge amount to be actually allocated to each of the vehicles; and control a charging device to cause all the vehicles to be charged based on a lower limit charge amount or more, when the determined charging plan is unachievable.

4 Claims, 6 Drawing Sheets

CONTROL APPARATUS FOR MANAGING CHARGING PLANS FOR VEHICLE BATTERIES

CROSS-REFERENCE TO RELATED APPLICATIONS

The present application claims priority from Japanese Patent Application No. 2023-054200 filed on Mar. 29, 2023, the entire contents of which are hereby incorporated by reference.

BACKGROUND

The disclosure relates to a control apparatus for a charging system that charges batteries of respective vehicles.

Electric vehicles and hybrid vehicles are becoming popular in order to reduce carbon dioxide emissions. For this reason, installation of charging devices in a parking lot provided in a facility such as an accommodation facility or a camping area has been considered as disclosed in, for example, Japanese Unexamined Patent Application Publication No. 2020-198737.

SUMMARY

An aspect of the disclosure provides a control apparatus for a charging system. The charging system is configured to charge batteries of vehicles respectively. The control apparatus includes one or more processors, and one or more memories coupled to the one or more processors. The one or more processors are configured to: acquire, from each of the vehicles, charging data comprising at least data on a target charge amount; determine, based on the charging data acquired from each of the vehicles, a charging plan comprising at least an actual charge amount to be actually allocated to each of the vehicles; and control a charging device to cause all the vehicles to be charged based on a lower limit charge amount or more, when the determined charging plan is unachievable.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
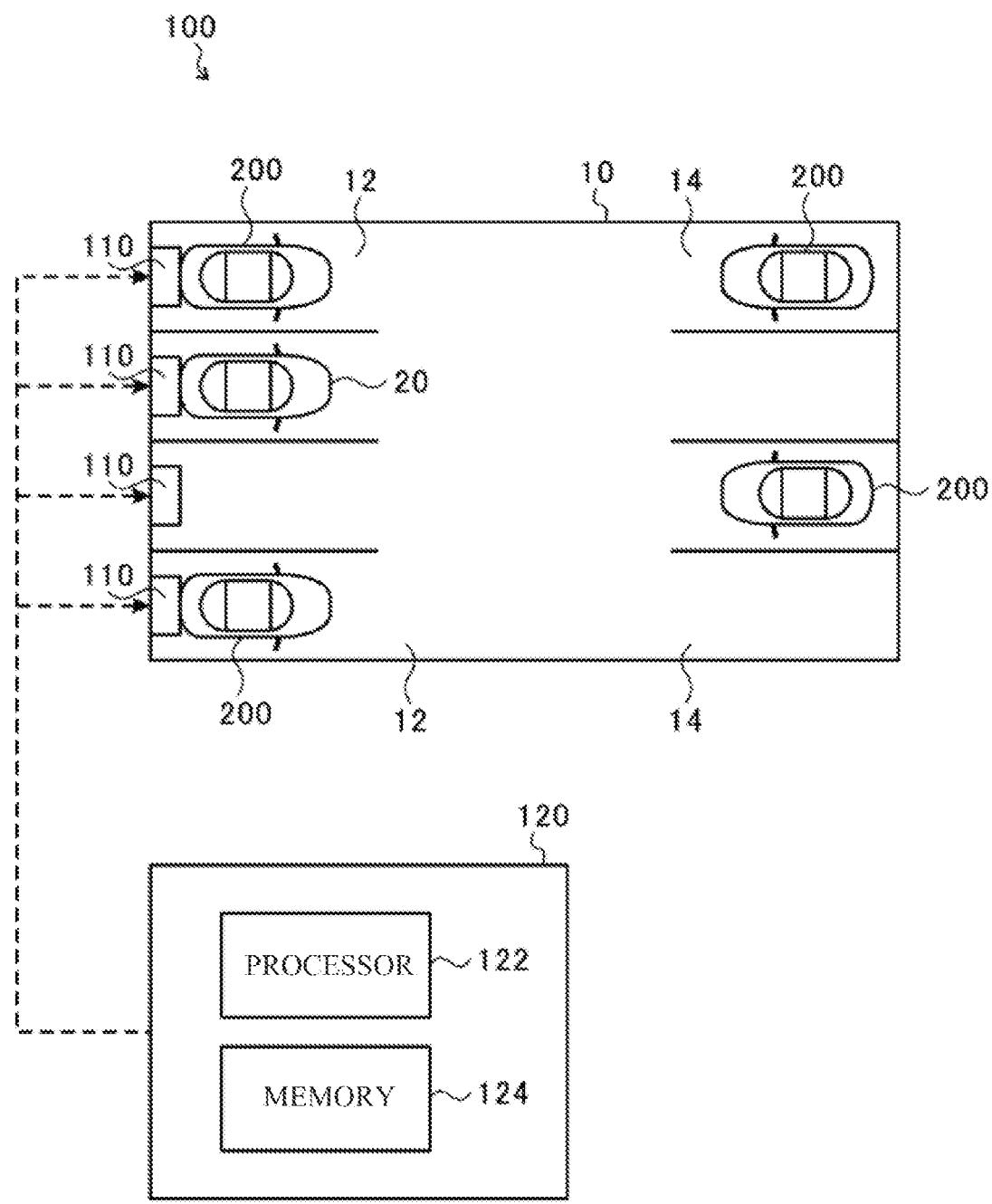
FIG. 1 is a schematic diagram illustrating a configuration of a charging system according to one example embodiment of the disclosure.

For example, when the number of charging devices in a parking lot is insufficient as compared with the number of vehicles to be charged, there is a possibility that a vehicle fails to be charged and is thus forced into an electricity shortage state.

It is desirable to provide a control apparatus that makes it possible to suppress an occurrence of a vehicle in an electricity shortage state.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is a schematic diagram illustrating a configuration of a charging system 100 according to an example embodiment of the disclosure. In FIG. 1, an arrow indicated by a broken line indicates a flow of a signal.

The charging system 100 is configured to charge a battery 210 of each vehicle 200. Referring to FIG. 1, the charging system 100 may be provided in a parking lot 10 such as a camping area or an accommodation facility. The parking lot 10 may include a charging area 12 and a standby area 14. The charging area 12 may be an area on the parking lot 10 in which later-described charging devices 110 are provided. The standby area 14 may be an area on the parking lot 10 in which the charging device 110 is not provided. In the example embodiment, four charging areas 12 and four standby areas 14 are provided in the parking lot 10, although it is not limited thereto. The charging area 12 and the standby area 14 each may have a size that allows, for example, one vehicle 200 to park.

[Vehicle 200]

Figure 2:
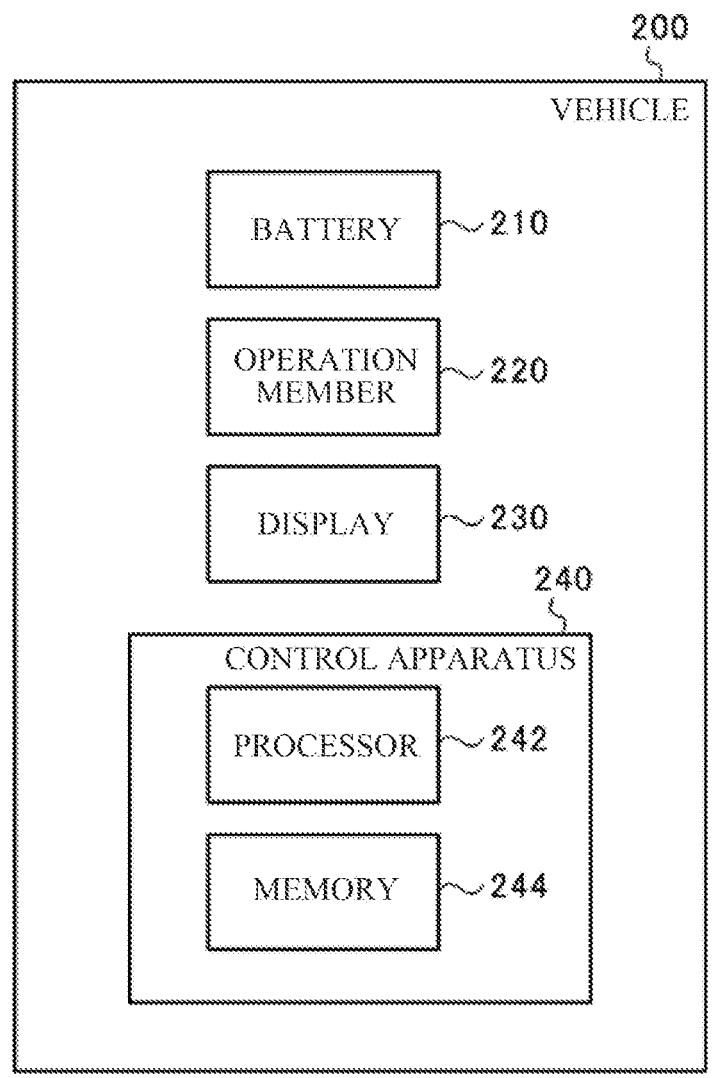
FIG. 2 is a schematic diagram illustrating a configuration of a vehicle illustrated in FIG. 1.

FIG. 2 is a schematic diagram illustrating a configuration of the vehicle 200 according to the example embodiment of the disclosure. Referring to FIG. 2, the vehicle 200 may include the battery 210, an operation member 220, a display 230, and a control apparatus 240.

The battery 210 may be a drive source of the vehicle 200. The vehicle 200 may be an electric vehicle or a hybrid vehicle.

The operation member 220 may receive an input of operation performed by an occupant of the vehicle 200. The operation member 220 may include a device such as a touch panel. Non-limiting examples of the display 230 may include a liquid crystal display and an organic electroluminescence (EL) display. The operation member 220 and the display 230 may serve as, for example, a part of a car navigation system included in the vehicle 200.

The control apparatus 240 includes one or more processors 242 and one or more memories 244 coupled to the one or more processor 242. The processor 242 may be or may include, for example, a central processing unit (CPU). The memory 244 may be or may include, for example, a read only memory (ROM) and a random access memory (RAM). The ROM may be a storage device that stores programs, operation parameters, etc., to be used by the CPU. The RAM may be a storage device that temporarily holds data such as variables or parameters used in a process to be executed by the CPU.

The control apparatus 240 may communicate with each device provided in the vehicle 200. Non-limiting examples of the device may include the battery 210, the operation member 220, and the display 230. The communication between the control apparatus 240 and each device may be based on, for example, a controller area network (CAN) communication.

Figure 3:
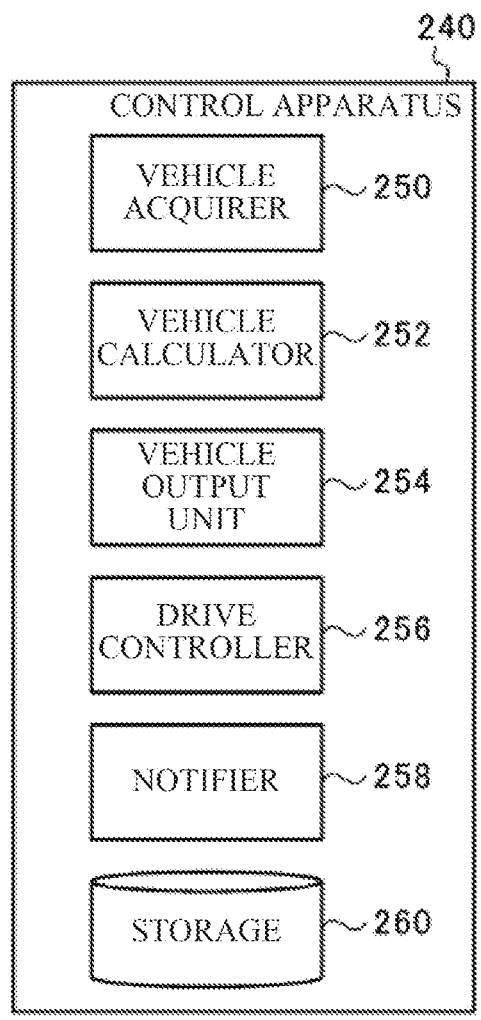
FIG. 3 is a block diagram illustrating an example of a configuration of a control apparatus for the vehicle illustrated in FIG. 1.

FIG. 3 is a block diagram illustrating an example of a configuration of the control apparatus 240 for the vehicle 200 according to the example embodiment of the disclosure. Referring to FIG. 3, the control apparatus 240 for the vehicle 200 may include, for example, a vehicle acquirer 250, a vehicle calculator 252, a vehicle output unit 254, a drive controller 256, a notifier 258, and a storage 260. For example, various kinds of processes including the following example processes to be performed by the vehicle acquirer 250, the vehicle calculator 252, the vehicle output unit 254, the drive controller 256, the notifier 258, and the storage 260 may be executed by the processor 242. In some embodiments, the processor 242 may execute a program stored in the memory 244 to execute the various processes.

The vehicle acquirer 250 may acquire destination data, departure time data, first vehicle data, and quick charging data, based on an input of an operation performed by the occupant of the vehicle 200 using the operation member 220. The vehicle acquirer 250 may acquire control data and end data from the later-described control apparatus 120 for the charging system 100.

The destination data may indicate a destination of the vehicle 200. The departure time data may indicate a scheduled departure time of the vehicle 200.

The first vehicle data may relate to a load of the vehicle 200. Non-limiting examples of the first vehicle data may include data indicating the number of occupants of the vehicle 200, data indicating a load amount, and data indicating a towing state. Non-limiting examples of the data indicating the towing state may include data indicating the presence of towing and data indicating a weight of a towed object.

The quick charging data may indicate whether to permit quick charging of the battery 210.

The vehicle calculator 252 may calculate a target charge amount, based on the destination data. For example, the target charge amount may be a capacity in which a current remaining capacity of the battery 210 is subtracted from a remaining capacity of the battery 210 necessary for traveling until the vehicle 200 arrives at the destination.

The vehicle output unit 254 may output, to the control apparatus 120 for the charging system 100: the destination data, the departure time data, the first vehicle data, and the quick charging data that are acquired by the vehicle acquirer 250; the data indicating the target charge amount calculated by the vehicle calculator 252; and second vehicle data stored in the storage 260 as charging data.

The second vehicle data may relate to the battery 210 of the vehicle 200. For example, the second vehicle data may indicate: a lowest voltage at which the battery 210 is usable; a resistance value of an electrolytic solution of the battery 210; and the presence of a battery heater adapted to heat the battery 210. The second vehicle data may be stored in advance in the storage 260.

The drive controller 256 may perform automated driving of the vehicle 200 by controlling a motor and a steering, based on the control data or the end data outputted from the control apparatus 120 for the charging system 100. When the control data is acquired, the drive controller 256 may perform the automated driving of the vehicle 200 from the standby area 14 to the charging area 12 of the parking lot 10. When the end data is acquired, the drive controller 256 may perform the automatic driving of the vehicle 200 from the charging area 12 to the standby area 14 of the parking lot 10.

The notifier 258 may control the display 230 or an unillustrated speaker to notify completion of charging, when the control data or the end data is acquired by the vehicle acquirer 250.

The storage 260 may store in advance the second vehicle data.

[Charging System 100]

Referring back to FIG. 1, the charging system 100 includes charging devices 110 and a control apparatus 120.

The charging devices 110 may be provided in the charging area 12 of the parking lot 10. The charging device 110 may charge the battery 210 of the vehicle 200 parked in the charging area 12. For example, the charging device 110 may be a contactless charging device.

The control apparatus 120 includes one or more processors 122 and one or more memories 124 coupled to the one or more processor 122. The processor 122 may be or may include, for example, a CPU. The memory 124 may be or may include, for example, a ROM and a RAM. The ROM may be a storage device that stores programs, operation parameters, etc., to be used by the CPU. The RAM may be a storage device that temporarily holds data such as variables or parameters used in a process to be executed by the CPU.

The control apparatus 120 may communicate with the vehicle 200 and the charging device 110. The communication between the control apparatus 120 and the vehicle 200 and the charging device 110 may be based on, for example, a CAN communication.

Figure 4:
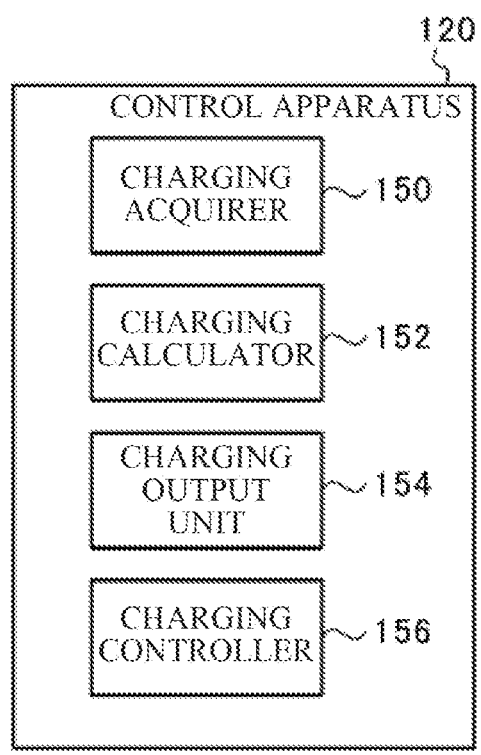
FIG. 4 is a block diagram illustrating an example of a configuration of a control apparatus according to one example embodiment of the disclosure.

FIG. 4 is a block diagram illustrating an example of a configuration of the control apparatus 120 according to the example embodiment of the disclosure. Referring to FIG. 4, the control apparatus 120 may include, for example, a charging acquirer 150, a charging calculator 152, a charging output unit 154, and a charging controller 156. For example, various kinds of processes including the following example processes to be performed by the charging acquirer 150, the charging calculator 152, the charging output unit 154, and the charging controller 156 may be executed by the processor 122. In some embodiments, the processor 122 may execute a program stored in the memory 124 to execute the various processes.

The charging acquirer 150 may acquire the charging data from each of the vehicles 200 to be charged in the parking lot 10. The charging data may include one or more of the destination data, the departure time data, the first vehicle data, the second vehicle data, the quick charging data, and the data indicating the target charge amount.

The charging acquirer 150 may establish a communication with an external server. For example, the charging acquirer 150 may acquire charging facility data, environment data, and road data from the external server.

The charging facility data may relate to charging facilities positioned away from the charging system 100 provided in the parking lot 10 where the vehicle 200 is parked. Hereinafter, the charging facilities positioned away from the charging system 100 may be referred to as "other charging facilities". Non-limiting examples of the charging facility data may include location data of other charging facilities, data indicating a charging capability, and data indicating a reservation status.

Non-limiting examples of the environment data may include data indicating the weather, data indicating an outside air temperature, and data indicating the sunrise time and the sunset time. Non-limiting examples of the road data may include data indicating a congestion state, data indicating a construction state of a road, data indicating an accident state of a road, and data indicating a gradient of a road.

The charging calculator 152 may decide a charging plan, based on the charging data acquired from each of the vehicles 200. The charging plan may include an actual charge amount to be actually allocated to each of the vehicles 200 and a charging start time of each of the vehicles 200. In the example embodiment, the charging plan may be a plan in which the charging start time of each of the vehicles 200 is so set that the actual charge amount corresponding to the target charge amount is to be allocated to all the vehicles 200 by the scheduled departure time.

The charging calculator 152 may determine whether the decided charging plan is achievable, based on the charging capabilities of all the charging devices 110 provided in the charging system 100.

If the charging calculator 152 determines that the decided charging plan is achievable, the charging output unit 154 may output, to each of the vehicles 200, control data indicating that the charging is to be performed based on the decided charging plan.

If the charging calculator 152 determines that the decided charging plan is unachievable, the charging calculator 152 may change the charging plan.

In the example embodiment, the charging calculator 152 may first decide a first charging plan, and decide a second charging plan when the first charging plan is unachievable. When the second charging plan is unachievable, the charging calculator 152 may decide a third charging plan.

For example, the first charging plan may be a plan in which the charging start time of each of the vehicles 200 is so set that the actual charge amount corresponding to the target charge amount is to be allocated to all the vehicles 200 by the scheduled departure time without using the quick charging.

Thereafter, the charging calculator 152 may determine whether the first charging plan is achievable, based on the charging capabilities of all the charging devices 110 provided in the charging system 100.

If the charging calculator 152 determines that the first charging plan is achievable, the charging output unit 154 may output, to each of the vehicles 200, first control data indicating that the charging is to be performed based on the first charging plan.

If the charging calculator 152 determines that the first charging plan is unachievable, the charging calculator 152 may decide the second charging plan. For example, the second charging plan may be a plan in which the quick charging is to be used for the vehicle 200 that permits the quick charging, and in which the charging start time of each of the vehicles 200 is so set that the actual charge amount corresponding to the target charge amount is to be allocated to all the vehicles 200 by the scheduled departure time.

Thereafter, the charging calculator 152 may determine whether the second charging plan is achievable, based on the charging capabilities of all the charging devices 110 provided in the charging system 100.

If the charging calculator 152 determines that the second charging plan is achievable, the charging output unit 154 may output, to each of the vehicles 200, second control data indicating that the charging is to be performed based on the second charging plan.

If the charging calculator 152 determines that the second charging plan is unachievable, the charging calculator 152 may decide the third charging plan. For example, the third charging plan may be a plan in which the charging start time of each of the vehicles 200 is so set that the actual charge amount corresponding to a lower limit charge amount or more is to be allocated to all the vehicles 200 by the scheduled departure time. Thereafter, the charging output unit 154 may output, to each of the vehicles 200, third control data indicating that the charging is to be performed based on the third charging plan.

The lower limit charge amount may be less than the target charge amount. In some embodiments, the lower limit charge amount may be decided based on charging facility data. In the example embodiment, the charging calculator 152 may refer to the charging facility data and acquire data indicating other charging facilities on a traveling route of the vehicles 200. The charging calculator 152 may extract, out of other charging facilities on the traveling route, a charging facility of interest that allows for charging of the battery 210 of each of the vehicles 200 when the vehicles 200 arrive at the charging facility of interest and that is the shortest in distance from the charging system 100. The charging calculator 152 may calculate, as the lower limit charge amount, the charge amount in which the current remaining capacity of the battery 210 is subtracted from the remaining capacity of the battery 210 which is necessary for corresponding one of the vehicles 200 to travel until arriving at the extracted charging facility of interest.

In some embodiments, the charging calculator 152 may calculate, based on various kinds of data, a correction amount and may add or subtract the correction amount to or from the target charge amount and the lower limit charge amount.

In some embodiments, the charging calculator 152 may calculate the correction amount, based on environment data. In such example embodiments, the charging calculator 152 may calculate the correction amount, based on weather data as an example of the environment data. For example, a wiper is to be operated upon rain or snow; accordingly, the charging calculator 152 may calculate an amount of operation of the wiper as the correction amount, when the weather data indicates rain or snow. The charging calculator 152 may add the correction amount to the target charge amount and the lower limit charge amount.

In some embodiments, the charging calculator 152 may calculate the correction amount, based on time data as an example of the environment data. For example, a headlight is to be operated at night; accordingly, the charging calculator 152 may calculate an amount of operation of the headlight as the correction amount, when the time data indicates night. The charging calculator 152 may add the correction amount to the target charge amount and the lower limit charge amount.

In some embodiments, the charging calculator 152 may calculate the correction amount, based on road data. In such example embodiments, the charging calculator 152 may calculate the correction amount, based on traffic congestion data as an example of the road data. For example, power consumption of the battery 210 can increase upon traffic congestion; accordingly, the charging calculator 152 may calculate the increase in power consumption of the battery 210 as the correction amount, when the congestion data is acquired. The charging calculator 152 may add the correction amount to the target charge amount and the lower limit charge amount.

In some embodiments, the charging calculator 152 may calculate the correction amount, based on gradient data as an example of the road data. For example, the power consumption of the battery 210 can increase upon traveling on an upward slope; accordingly, the charging calculator 152 may calculate the increase in power consumption of the battery 210 as the correction amount, when the road data is the gradient data indicating the upward slope. The charging calculator 152 may add the correction amount to the target charge amount and the lower limit charge amount. For example, it is possible to perform regeneration based on the battery 210 upon traveling on a downward slope and to suppress a decrease in a remaining capacity of the battery 210 owing to regenerative electric power; accordingly, the charging calculator 152 may calculate an amount of the regenerative electric power as the correction amount, when the road data is the gradient data indicating the downward slope. The charging calculator 152 may subtract the correction amount from the target charge amount and the lower limit charge amount.

In some embodiments, the charging calculator 152 may calculate the correction amount, based on the vehicle data. In such example embodiments, the charging calculator 152 may calculate the correction amount, based on the first vehicle data. For example, the power consumption of the battery 210 can increase when the load of the vehicle 200 is large; accordingly, the charging calculator 152 may calculate, as the correction amount, an amount of power consumption that increases due to the load of the vehicle 200, based on the first vehicle data. The charging calculator 152 may add the correction amount to the target charge amount and the lower limit charge amount.

In some embodiments, the charging calculator 152 may calculate the correction amount, based on the second vehicle data. For example, the battery heater is to be operated when the battery heater is provided; accordingly, the charging calculator 152 may calculate an amount of operation of the battery heater as the correction amount, when the second vehicle data indicates that the battery heater is provided. The charging calculator 152 may add the correction amount to the target charge amount and the lower limit charge amount.

It should be noted that the charging calculator 152 may combine in any combination the calculation of the correction amount which is based on the environment data, the calculation of the correction amount which is based on the road data, and the calculation of the correction amount which is based on the vehicle data.

In some embodiments, the charging calculator 152 may calculate the correction amount, based on the environment data and the second vehicle data. In such example embodiments, the charging calculator 152 may calculate the correction amount, based on outside air temperature data of the environment data and the second vehicle data. For example, the resistance value of the electrolytic solution of the battery 210 can increase and a minimum voltage at which the battery 210 is able to activate increases when the outside air temperature is low. Accordingly, the charging calculator 152 may calculate the increase in resistance value of the electrolytic solution as the correction amount, when the outside air temperature data indicates the outside air temperature that is less than a predetermined temperature and the second vehicle data indicates that the battery heater is not provided. When the outside air temperature data indicates the outside air temperature that is less than the predetermined temperature and the second vehicle data indicates that the battery heater is provided, the charging calculator 152 may calculate an amount of operation of the battery heater as the correction amount. The charging calculator 152 may add the correction amount to the target charge amount and the lower limit charge amount.

In some embodiments, upon deciding the third charging plan, the charging calculator 152 may so decide the third charging plan that, when the charging capabilities of all the charging devices 110 provided in the charging system 100 become surplus as a result of allocating the lower limit charge amount to all the vehicles 200, an amount corresponding to the surplus is equally allocated to all the vehicles 200. In some embodiments, the charging calculator 152 may so decide the third charging plan as to allocate the amount corresponding to the surplus in order from the vehicle 200 having the smaller target charge amount out of the vehicles 200.

In some embodiments, the charging start time may be decided based on one or more of the departure time data, the quick charging data, and the target charge amount. In one example, the charging start time may be decided in order of the scheduled departure time by referring to the departure time data. In one example, when the number of vehicles 200 having the same scheduled departure time is larger than the number of charging devices 110, the charging start time of the vehicle 200 that permits the quick charging may be made earlier by referring to the quick charging data. In one example, the charging start time of the vehicle 200 having the smaller target charge amount may be made earlier.

The charging output unit 154 may output, to each of the vehicles 200, the end data indicating that the charging is completed, when the charging of the vehicles 200 by the charging devices 110 is completed.

The charging controller 156 may so control the charging device 110 that, when the vehicle 200 that has acquired the first control data is parked in the charging area 12, the vehicle 200 is charged based on the target charge amount.

The charging controller 156 may so control the charging device 110 that, when the vehicle 200 that has acquired the second control data and does not permit the quick charging is parked in the charging area 12, the vehicle 200 is charged based on the target charge amount.

The charging controller 156 may so control the charging device 110 that, when the vehicle 200 that has acquired the second control data and permits the quick charging is parked in the charging area 12, the vehicle 200 is charged based on the target charge amount by the quick charging.

The charging controller 156 may so control the charging device 110 that, when the vehicle 200 that has acquired the third control data is parked in the charging area 12, the vehicle 200 is charged based on the lower limit charge amount or more.

[Charging Method]

Next, an example of a method of charging the vehicle 200 using the charging system 100 will be described. First, processes to be performed by the control apparatus 240 for the vehicle 200 will be described, following which processes to be performed by the control apparatus 120 for the charging system 100 will be described.

[Example Processes by Control Apparatus 240 for Vehicle 200]

Figure 5:
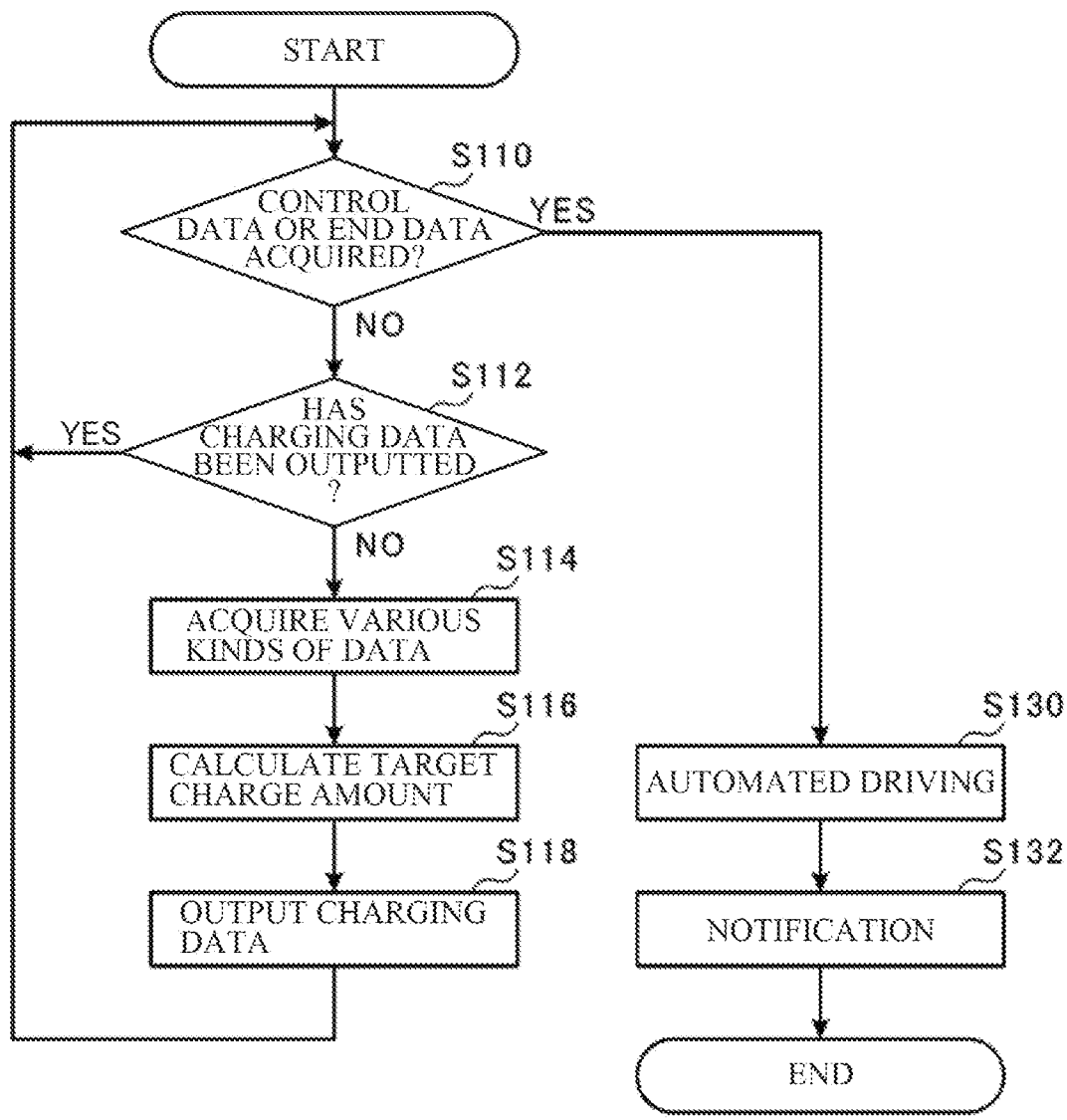
FIG. 5 is a flowchart illustrating a flow of processes to be performed by the control apparatus for the vehicle based on a charging method according to one example embodiment of the disclosure.

FIG. 5 is a flowchart illustrating a flow of processes to be performed by the control apparatus 240 for the vehicle 200 based on the charging method according to the example embodiment of the disclosure. Referring to FIG. 5, the control apparatus 240 for the vehicle 200 based on the charging method according to the example embodiment may execute a data acquisition determination process S110, an output completion determination process S112, a data acquisition process S114, a target charge amount calculation process S116, a charging data output process S118, an automated driving process S130, and a notification process S132. Hereinafter, each process will be described.

[Data Acquisition Determination Process S110]

The vehicle acquirer 250 may determine whether one of the first to the third control data or the end data outputted from the control apparatus 120 for the charging system 100 is acquired. If the vehicle acquirer 250 determines that one of the first to the third control data or the end data is acquired (YES in S110), the vehicle acquirer 250 may shift the process to the automated driving process S130. If the vehicle acquirer 250 determines that the first to the third control data and the end data are not acquired (NO in S110), the vehicle acquirer 250 may shift the process to the output completion determination process S112.

[Output Completion Determination Process S112]

The vehicle output unit 254 may determine whether the charging data has been outputted. If the vehicle output unit 254 determines that the charging data has been outputted (YES in S112), the vehicle output unit 254 may return the process to the data acquisition determination process S110. If the vehicle output unit 254 determines that the charging data has not been outputted (NO in S112), the vehicle output unit 254 may shift the process to the data acquisition process S114.

[Data Acquisition Process S114]

The vehicle acquirer 250 may acquire various kinds of data in response to the input of operation performed by the occupant of the vehicle 200 using the operation member 220.

[Target Charge Amount Calculation Process S116]

The vehicle calculator 252 may calculate the target charge amount.

[Charging Data Output Process S118]

The vehicle output unit 254 may output the charging data to the control apparatus 120 for the charging system 100.

[Automated Driving Process S130]

When the vehicle acquirer 250 has acquired one of the first to the third control data, the drive controller 256 may perform the automated driving of the vehicle 200 from the standby area 14 to the charging area 12 in the parking lot 10. When the vehicle acquirer 250 has acquired the end data, the drive controller 256 may perform the automated driving of the vehicle 200 from the charging area 12 to the standby area 14 in the parking lot 10.

[Notification Process S132]

The notifier 258 may control the display 230 or the unillustrated speaker to notify completion of the charging. In one example, the notifier 258 may notify that the charging of the target charge amount is completed when the first control data is acquired. In one example, the notifier 258 may notify that the quick charging is performed and that the charging of the target charge amount is completed, when the second control data is acquired after the output of data indicating that the quick charging is permitted as the quick charging data. In one example, the notifier 258 may notify that the charging of the target charge amount is completed, when the second control data is acquired after the output of data indicating that the quick charging is not permitted as the quick charging data. In one example, the notifier 258 may notify that the charging of the target charge amount is not performed but the charging of the lower limit charge amount or more is completed, when the third control data is acquired.

[Example Processes by Control Apparatus 120 for Charging System 100]

Figure 6:
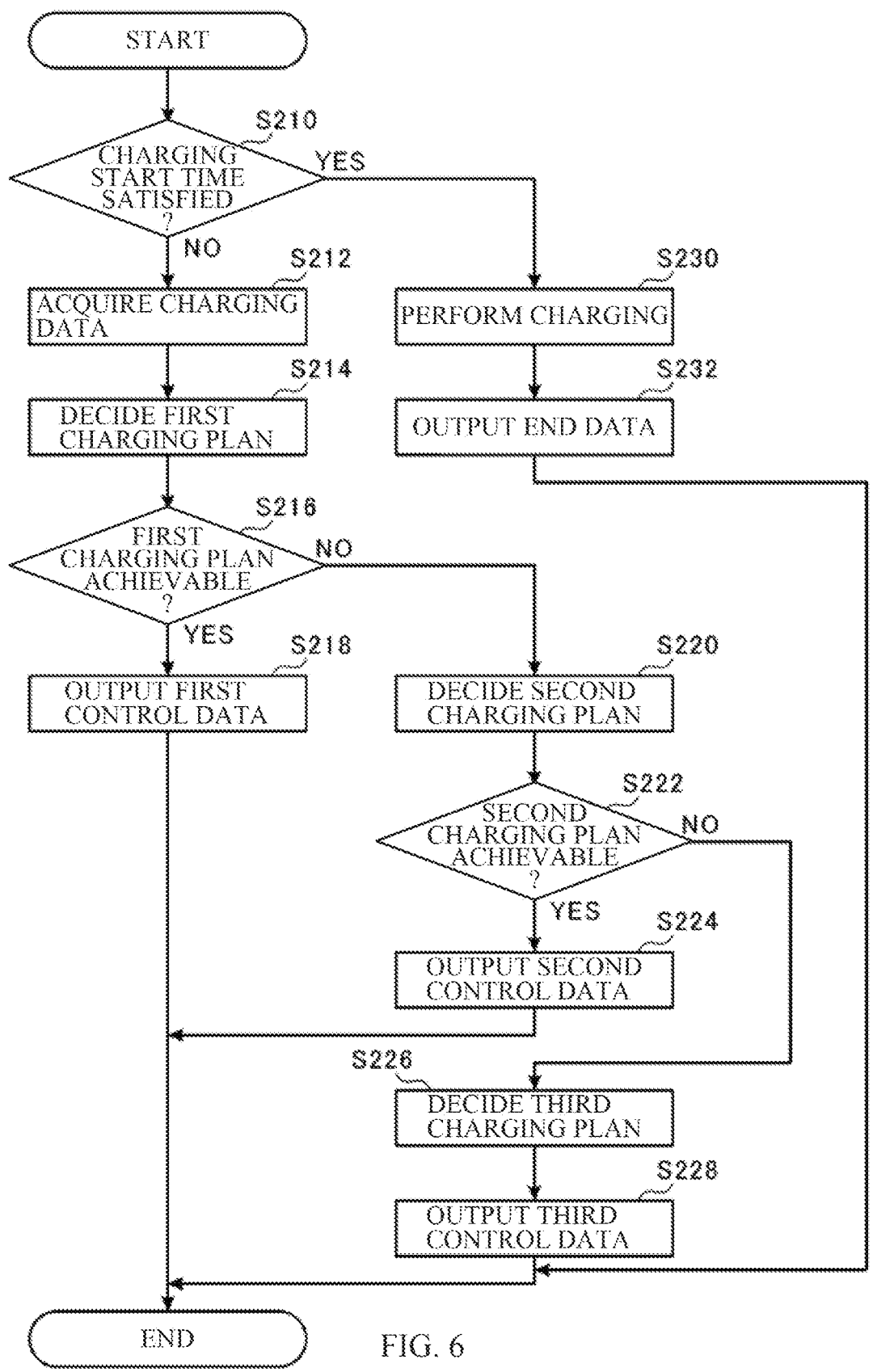
FIG. 6 is a flowchart illustrating a flow of processes to be performed by the control apparatus for the charging system based on the charging method according to one example embodiment of the disclosure.

FIG. 6 is a flowchart illustrating a flow of processes to be performed by the control apparatus 120 for the charging system 100 based on the charging method according to the example embodiment of the disclosure. Referring to FIG. 6, the control apparatus 120 for the charging system 100 based on the charging method according to the example embodiment may execute a charging start time determination process S210, a charging data acquisition process S212, a first charging plan decision process S214, a first achievement determination process S216, a first control data output process S218, a second charging plan decision process S220, a second achievement determination process S222, a second control data output process S224, a third charging plan decision process S226, a third control data output process S228, a charging process S230, and an end data output process S232. Hereinafter, each process will be described.

[Charging Start Time Determination Process S210]

The charging controller 156 may determine whether the charging start time is satisfied. If the charging controller 156 determines that the charging starting time is not satisfied (NO in S210), the charging controller 156 may shift the process to the charging data acquisition process S212. If the charging controller 156 determines that the charging starting time is satisfied (YES in S210), the charging controller 156 may shift the process to the charging process S230.

[Charging Data Acquisition Process S212]

The charging acquirer 150 may acquire the charging data from all the vehicles 200 to be charged in the parking lot 10.

[First Charging Plan Decision Process S214]

The charging calculator 152 may decide the first charging plan.

[First Achievement Determination Process S216]

The charging calculator 152 may determine whether the first charging plan is achievable, based on the charging capabilities of all the charging devices 110 provided in the charging system 100. If the charging calculator 152 determines that the first charging plan is achievable (YES in S216), the charging calculator 152 may shift the process to the first control data output process S218. If the charging calculator 152 determines that the first charging plan is unachievable (NO in S216), the charging calculator 152 may shift the process to the second charging plan decision process S220.

[First Control Data Output Process S218]

The charging output unit 154 may output, to each of the vehicles 200, the first control data indicating that the charging is to be performed based on the first charging plan.

[Second Charging Plan Decision Process S220]

The charging calculator 152 may decide the second charging plan.

[Second Achievement Determination Process S222]

The charging calculator 152 may determine whether the second charging plan is achievable, based on the charging capabilities of all the charging devices 110 provided in the charging system 100. If the charging calculator 152 determines that the second charging plan is achievable (YES in S222), the charging calculator 152 may shift the process to the second control data output process S224. If the charging calculator 152 determines that the second charging plan is unachievable (NO in S222), the charging calculator 152 may shift the process to the third charging plan decision process S226.

[Second Control Data Output Process S224]

The charging output unit 154 may output, to each of the vehicles 200, the second control data indicating that the charging is to be performed based on the second charging plan.

[Third Charging Plan Decision Process S226]

The charging calculator 152 may decide the third charging plan.

[Third Control Data Output Process S228]

The charging output unit 154 may output, to each of the vehicles 200, the third control data indicating that the charging is to be performed based on the third charging plan.

[Charging Process S230]

The charging controller 156 may so control the charging device 110 that, when the vehicle 200 that has acquired the first control data is parked in the charging area 12, the vehicle 200 is charged based on the target charge amount. The charging controller 156 may so control the charging device 110 that, when the vehicle 200 that has acquired the second control data and does not permit the quick charging is parked in the charging area 12, the vehicle 200 is charged based on the target charge amount. The charging controller 156 may so control the charging device 110 that, when the vehicle 200 that has acquired the second control data and permits the quick charging is parked in the charging area 12, the vehicle 200 is charged based on the target charge amount by the quick charging. The charging controller 156 may so control the charging device 110 that, when the vehicle 200 that has acquired the third control data is parked in the charging area 12, the vehicle 200 is charged based on the lower limit charge amount or more.

[End Data Output Process S232]

The charging output unit 154 may output, to each of the vehicles 200, the end data indicating that the charging is completed.

The charging system 100 according to the example embodiment controls the charging device 110 to cause all the vehicles 200 to be charged based on the lower limit charge amount or more when the charging plan is unachievable. Accordingly, the charging system 100 helps to suppress an occurrence of the vehicle 200 in an electricity shortage state in the parking lot 10.

In some embodiments, the lower limit charge amount may be decided based on the data on the charging facility that is positioned away from the charging system 100. Accordingly, the charging system 100 helps to cause all the vehicles 200 to travel at least to the charging facility of interest out of other charging facilities.

In some embodiments, the lower limit charge amount may be decided based on the environment data. Thus, it is possible for the vehicle calculator 252 to calculate the lower limit charge amount with high accuracy. Accordingly, the charging system 100 helps to reliably allow all the vehicles 200 to travel at least to the charging facility of interest out of other charging facilities.

In some embodiments, the lower limit charge amount may be decided based on the road data. Thus, it is possible for the vehicle calculator 252 to calculate the lower limit charge amount with high accuracy. Accordingly, the charging system 100 helps to reliably allow all the vehicles 200 to travel at least to the charging facility of interest out of other charging facilities.

In some embodiments, the lower limit charge amount may be decided based on the vehicle data. Thus, it is possible for the vehicle calculator 252 to calculate the lower limit charge amount with high accuracy. Accordingly, the charging system 100 helps to reliably allow all the vehicles 200 to travel at least to the charging facility of interest out of other charging facilities.

In some embodiments, the lower limit charge amount may be decided based on the departure time data, the environment data, and the second vehicle data. This configuration helps to allows the vehicle 200 to reliably activate the battery 210 even in an extremely low temperature environment.

In some embodiments, the charging calculator 152 may decide the first charging plan without the quick charging, and decide the second charging plan with the quick charging when the first charging plan is unachievable. Thus, it is possible for the charging system 100 to suppress the quick charging of the vehicle 200. Accordingly, the charging system 100 helps to perform the charging while suppressing a deterioration of the battery 210 of the vehicle 200.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the example embodiment, the target charge amount may be the charge amount in which the current remaining capacity of the battery 210 is subtracted from the remaining capacity of the battery 210 necessary for traveling until the vehicle 200 arrives at the destination. However, the target charge amount is not limited thereto. In some embodiments, the target charge amount may be a charge amount by which the battery 210 is fully charged.

In the example embodiment, the lower limit charge amount may be the charge amount in which the current remaining capacity of the battery 210 is subtracted from the remaining capacity of the battery 210 necessary for traveling until corresponding one of the vehicles 200 arrives at the charging facility of interest out of other charging facilities. The charging facility of interest may allow for charging of the battery 210 of the corresponding one of the vehicles 200 when the corresponding one of the vehicles 200 arrives at the charging facility of interest, and may be the shortest in distance from the charging system 100. However, the lower limit charge amount is not limited thereto. In some embodiments, the lower limit charge amount may be a charge amount that is half of the target charge amount. In some embodiments, the lower limit charge amount may be a fixed value.

In the example embodiment, the vehicle acquirer 250 may acquire the destination data, the departure time data, the charging facility data, the first vehicle data, and the quick charging data in response to the input of operation performed by the occupant of the vehicle 200 using the operation member 220. In some embodiments, the vehicle acquirer 250 may acquire one or more of pieces of data including the destination data, the departure time data, the charging facility data, the first vehicle data, and the quick charging data in response to an input of operation performed by the occupant of the vehicle 200 using a smart device such as a smartphone.

In the example embodiment, the charging controller 156 may so control the charging device 110 that, when the vehicle 200 that permits the quick charging is parked in the charging area 12, the charging based on the target charge amount is performed by the quick charging. In some embodiments, when the vehicle 200 that permits the quick charging is parked in the charging area 12, the charging controller 156 may start the charging based on a normal charging and switch from the middle to the quick charging, based on a temperature of the battery 210. For example, the charging controller 156 may calculate the degree of deterioration of the battery 210 in a case of performing the quick charging, based on the temperature of the battery 210. When the deterioration degree is less than a predetermined threshold, the normal charging may be switched to the quick charging.

In some embodiments, an operation of the control apparatus 120 for the charging system 100 may be divided into operations to be performed by multiple control apparatuses. In some embodiments, a part of the processes to be performed by the control apparatus 120 may be performed by the control apparatus 240 for the vehicle 200.

In the example embodiment, the vehicle 200 that has acquired the control data may move from the standby area 14 to the charging area 12 by the automated driving. In some embodiments, the vehicle 200 may be moved from the standby area 14 to the charging area 12 by driving performed by a driver who drives the vehicle 200, when the control data is acquired. In such embodiments, the charging device 110 may be a contact-based charging device.

The processor 122 illustrated in FIG. 1, the processor 242 illustrated in FIG. 2, or both are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 122, the processor 242, or both. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 122 illustrated in FIG. 1, the processor 242 illustrated in FIG. 2, or both.

The invention claimed is:

1. A control apparatus for a charging system, the charging system being configured to charge batteries of vehicles respectively, the control apparatus comprising:
one or more processors; and
one or more memories coupled to the one or more processors, wherein
the one or more processors are configured to:
acquire, from each of the vehicles, charging data comprising at least data on a current location and a destination, and data on a target charge amount, the target charge amount for each respective vehicle being equal to a capacity required for that respective vehicle to travel from the current location to the destination minus a current remaining capacity of a battery of that respective vehicle;
determine, based on the charging data acquired from each of the vehicles, a first charging plan that sets, for each respective vehicle, a first actual charge amount equal to the target charge amount;
determine whether the first charging plan is achievable based on charging capabilities of one or more of charging devices in the charging system;
in response to determining that the first charging plan is unachievable, determine a second charging plan that sets, for each respective vehicle, a second actual charge amount at least as great as a lower limit charge amount, wherein the one or more processors are further configured to:
acquire, from an external server, charging facility data for a plurality of charging facilities located away from the charging system;
identify, for each vehicle, a charging facility of interest on a planned travel route to the destination that (i) allows the vehicle to be charged upon arrival and (ii) is nearest in distance from the charging system; and
determine, for each vehicle, the lower limit charge amount as a capacity required to travel from the charging system to the charging facility of interest minus a current remaining capacity of the vehicle's battery; and
control the one or more charging devices to charge the vehicles according to whichever of the first charging plan and the second charging plan is determined to be achievable.

2. The control apparatus according to claim 1, wherein the one or more processors are configured to:
acquire environment data from an external server; and
determine the lower limit charge amount based on environment data, the environment data comprising at least one of weather data, outside air temperature data, and sunrise and sunset time data.

3. The control apparatus according to claim 1, wherein the one or more processors are configured to:
acquire road data from an external server; and
determine the lower limit charge amount based on road data, the road data comprising at least one of traffic congestion data, road construction data, road accident data, and road gradient data.

4. The control apparatus according to claim 1, wherein the one or more processors are configured to:
acquire vehicle data from each of the vehicles; and
determine the lower limit charge amount based on vehicle data, the vehicle data comprising at least one of first vehicle data relating to a load of the vehicle and second vehicle data relating to a battery of the vehicle.

* * * * *